(12) United States Patent
Masoud et al.

(10) Patent No.: US 9,709,915 B2
(45) Date of Patent: Jul. 18, 2017

(54) ELECTROSTATIC INK COMPOSITIONS

(71) Applicant: Hewlett-Packard Indigo B.V., Amstelveen (NL)

(72) Inventors: Emad Masoud, Nes Ziona (IL); Yael Kowal-Blau, Givataim (IL); Albert Teishev, Rishon le-zion (IL); Nurit Carmel-Barnea, Nes Ziona (IL)

(73) Assignee: Hewlett-Parkard Indigo B.V., Maastricht (NL)

( * ) Notice: Subject to any disclaimer, the term of this patent is extended or adjusted under 35 U.S.C. 154(b) by 0 days.

(21) Appl. No.: 15/102,860

(22) PCT Filed: Jan. 24, 2014

(86) PCT No.: PCT/EP2014/051447
§ 371 (c)(1),
(2) Date: Jun. 8, 2016

(87) PCT Pub. No.: WO2015/110174
PCT Pub. Date: Jul. 30, 2015

(65) Prior Publication Data
US 2016/0306287 A1    Oct. 20, 2016

(51) Int. Cl.
*G03G 9/135* (2006.01)
*C09D 11/03* (2014.01)
*G03G 13/18* (2006.01)

(52) U.S. Cl.
CPC ........... *G03G 9/1355* (2013.01); *C09D 11/03* (2013.01); *G03G 9/135* (2013.01); *G03G 13/18* (2013.01)

(58) Field of Classification Search
CPC ...... G03G 9/1355; G03G 9/135; G03G 13/10; G03G 13/18; C09D 11/03
USPC .................................. 430/115, 114
See application file for complete search history.

(56) References Cited

U.S. PATENT DOCUMENTS

| | | | |
|---|---|---|---|
| 3,405,683 A | 10/1968 | Jons et al. | |
| 3,417,019 A | 12/1968 | Beyer | |
| 3,844,811 A | 10/1974 | Brynko | |
| 3,900,003 A | 8/1975 | Sato et al. | |
| 4,073,266 A | 2/1978 | Arneth et al. | |
| 4,201,685 A * | 5/1980 | Amariti | C08F 8/30 430/114 |
| 4,259,428 A * | 3/1981 | Tsuneda | G03G 9/131 430/115 |
| 4,342,823 A | 8/1982 | Grant et al. | |
| 4,400,079 A | 8/1983 | Landa | |
| 4,504,138 A | 3/1985 | Kuehnle et al. | |
| 4,690,539 A | 9/1987 | Radulski et al. | |
| 4,988,602 A | 1/1991 | Jongewaard et al. | |
| 5,749,032 A | 5/1998 | Landa et al. | |
| 6,569,591 B2 | 5/2003 | Moffat et al. | |
| 6,905,807 B2 | 6/2005 | Morrison et al. | |
| 8,198,353 B2 | 6/2012 | Cooper | |
| 8,440,381 B2 | 5/2013 | Mor et al. | |
| 2003/0059702 A1 | 3/2003 | Moffat et al. | |
| 2003/0134940 A1 | 7/2003 | Morrison et al. | |
| 2009/0311614 A1 * | 12/2009 | Almog | B82Y 30/00 430/9 |
| 2011/0129606 A1 | 6/2011 | Cooper | |
| 2011/0217650 A1 * | 9/2011 | Mor | C09D 11/03 430/115 |

FOREIGN PATENT DOCUMENTS

| | | |
|---|---|---|
| WO | WO 2006/033092 | 3/2006 |
| WO | WO-2007/130069 | 11/2007 |
| WO | WO-2012/105951 A1 * | 8/2012 |
| WO | WO-2012/130303 A1 * | 10/2012 |
| WO | WO 2012/134457 | 10/2012 |
| WO | WO 2013/007307 | 1/2013 |
| WO | WO 2013/044991 | 4/2013 |
| WO | WO 2013/107498 | 7/2013 |

OTHER PUBLICATIONS

International Search Report and Written Opinion for International Application No. PCT/EP2014/051447 dated Sep. 2, 2014, 9 pages.

* cited by examiner

*Primary Examiner* — Janis L Dote
(74) *Attorney, Agent, or Firm* — HP Inc. Patent Department

(57) ABSTRACT

Herein is disclosed an electrostatic ink composition comprising: a) chargeable particles comprising a resin; b) a charge director comprising a sulfosuccinate salt of the general formula M'A$_m$, wherein M' is a metal, m is the valence of M', and A is an ion of the general formula (I): (I) [R$_3$—O—C(O)CH$_2$CH(SO$_3$)C(O)—O—R$_4$]$^-$ wherein each of R$_3$ and R$_4$ is an alkyl group; and c) an optionally substituted naphthalene-sulfonate moiety. Also disclosed is a method of manufacturing an electrostatic ink composition and a printed medium having printed thereon an electrostatic ink composition.

11 Claims, 1 Drawing Sheet

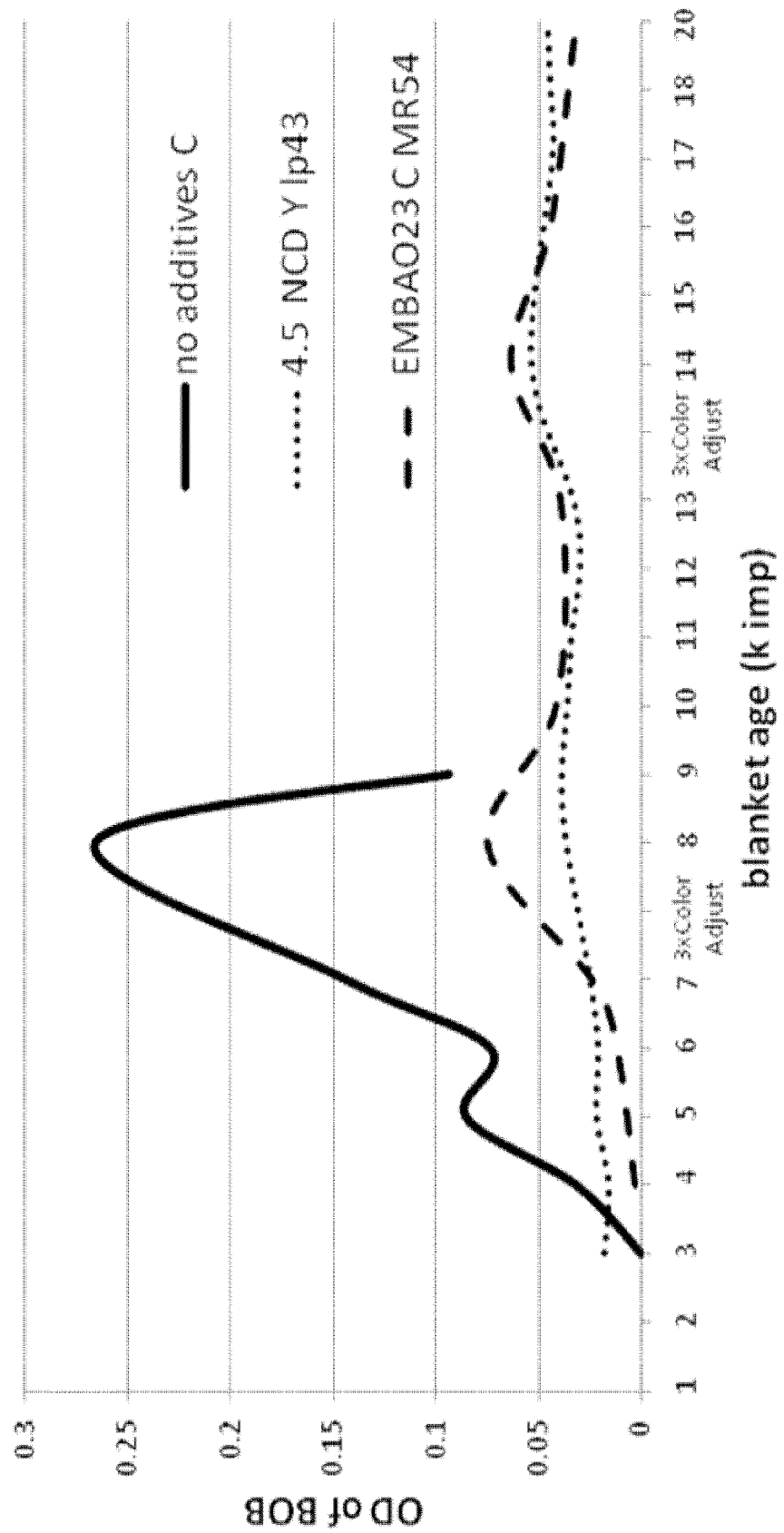

ELECTROSTATIC INK COMPOSITIONS

BACKGROUND

Electrophotographic printing processes, sometimes termed electrostatic printing processes, typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition including charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, which is often heated to fuse the solid image and evaporate the liquid carrier, and then to the print substrate.

BRIEF DESCRIPTION OF THE FIGURE

FIG. 1 shows the Background accumulation On Blanket (BOB) produced when printing using the working solutions of Example 2 (containing a synthetic charge director (SCD) and naphthalene-sulfonate moiety) and Comparative Examples 3 and 4 (containing a natural charge director (NCD) and SCD present respectively, the naphthalene-sulfonate moiety only present in the NCD-containing composition). The Optical Density (OD) of the BOB is plotted against the stage of printing at which it was measured. After each stage the background accumulation was cleaned from the blanket.

DETAILED DESCRIPTION

Before the methods, compositions, print substrates and related aspects of the disclosure are disclosed and described, it is to be understood that this disclosure is not limited to the particular process steps and materials disclosed herein because such process steps and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymer resin, colorant, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to an ink composition, which may be in dry powder or liquid form, that is typically suitable for use in an electrostatic printing process, sometimes termed an electrophotographic printing process. The electrostatic ink composition may include chargeable particles of the resin and the colorant dispersed in a liquid carrier, which may be as described herein.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrophotographic ink composition to an electric field, e.g. an electric field having a field strength of 1000 V/cm or more, in some examples 1000 V/mm or more.

As used herein, the term "about" is used to provide flexibility to a numerical range endpoint by providing that a given value may be a little above or a little below the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

In an aspect, there is provided an electrostatic ink composition including:
a) chargeable particles including a resin;
b) a charge director including a sulfosuccinate salt of the general formula M'A$_m$, wherein M' is a metal, m is the valence of M', and A is an ion of the general formula (I):

[R$_3$—O—C(O)CH$_2$CH(SO$_3$)C(O)—O—R$_4$]$^-$     (I)

wherein each of R$_3$ and R$_4$ is an alkyl group; and
c) an optionally substituted naphthalene-sulfonate moiety.

In an aspect, there is provided a method of electrostatic printing, the method including:
providing an electrostatic ink composition as described herein,
contacting the electrostatic ink composition with a latent electrostatic image on a surface to create a developed image,
transferring the developed image to a print substrate, in some examples via an intermediate transfer member.

In an aspect, there is provided a print substrate having printed thereon an electrostatic ink composition including:
a) a resin;
b) a charge director including a sulfosuccinate salt of the general formula M'A$_m$, wherein M' is a metal, m is the valence of M', and A is an ion of the general formula (I):

[R$_3$—O—C(O)CH$_2$CH(SO$_3$)C(O)—O—R$_4$]$^-$     (I)

wherein each of R$_3$ and R$_4$ is an alkyl group; and
c) an optionally substituted naphthalene-sulfonate moiety.

The use of a charge director including a sulfosuccinate salt, rather than some of the commercially available charge directors that are based on lecithin, in electrostatic inks has many advantages. However, the inventors have found that, in some circumstances, a use of a sulfosuccinate salt has led to charged particles of ink being retained on the blanket during printing, rather than making the transfer onto the print substrate, leading to a so-called Background-on-Blanket (BOB) effect. Some previous attempts to address this effect, for example by adding polydimethylsiloxane (PDMS) to the electrostatic inks, has led to other undesired effects, such as blanket memory and poor blanket durability.

The inventors have now found that, by adding a naphthalene sulfonate additive to the inks containing a sulfosuccinate salt charge director, there seems to be a decreased BOB effect.

Naphthalene Sulfonate

The electrostatic ink composition includes an optionally substituted naphthalene-sulfonate moiety, which may be termed a naphthalene sulfonate herein. The optionally substituted naphthalene-sulfonate moiety may be a compound including a naphthalene ring, having thereon a sulfonate group, which may be acid form (—SO$_3$H) or salt form (—SO$_3$—) and associated with a counterion; and, in some examples, the naphthalene sulfonate ring has thereon one or more substituents.

The one or more substituents on the naphthalene ring may be selected from optionally substituted alkyl, halogen, nitro, cyano, hydroxy, optionally substituted alkoxy, optionally substituted amino, alkoxycarbonyl, optionally substituted alkylcarbonyloxy, optionally substituted aryl, optionally substituted heteroaryl, optionally substituted arylalkoxy, optionally substituted acyl, and optionally substituted aminocarbonyl.

In some examples, the optionally substituted naphthalene-sulfonate moiety is of the formula (I) below.

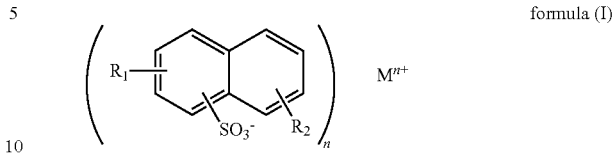

formula (I)

wherein SO3$^-$ is at any position on the ring shown in formula (I), and R$_1$ and R$_2$ are each independently selected from hydrogen, optionally substituted alkyl, halogen, nitro, cyano, hydroxy, optionally substituted alkoxy, optionally substituted amino, alkoxycarbonyl, optionally substituted alkylcarbonyloxy, optionally substituted aryl, optionally substituted heteroaryl, optionally substituted arylalkoxy, optionally substituted acyl, and optionally substituted aminocarbonyl, wherein M is selected from H, a metal and NH$_4$, and n is the valence of M.

In some examples, the optionally substituted naphthalene-sulfonate moiety is of the formula (II) below

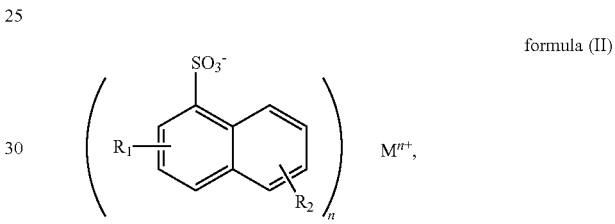

formula (II)

wherein R$_1$ and R$_2$ are each independently selected from hydrogen, optionally substituted alkyl, halogen, nitro, cyano, hydroxy, optionally substituted alkoxy, optionally substituted amino, alkoxycarbonyl, optionally substituted alkylcarbonyloxy, optionally substituted aryl, optionally substituted heteroaryl, optionally substituted arylalkoxy, optionally substituted acyl, and optionally substituted aminocarbonyl, wherein M is selected from H, a metal and NH$_4$, and n is the valence of M.

In some examples, the optionally substituted naphthalene-sulfonate moiety is of the formula (III) below

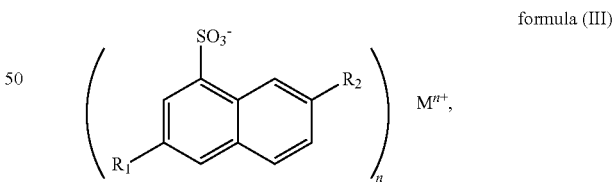

formula (III)

wherein R$_1$ and R$_2$ are each independently selected from hydrogen, optionally substituted alkyl, halogen, nitro, cyano, hydroxy, optionally substituted alkoxy, optionally substituted amino, alkoxycarbonyl, optionally substituted alkylcarbonyloxy, optionally substituted aryl, optionally substituted heteroaryl, optionally substituted arylalkoxy, optionally substituted acyl, and optionally substituted aminocarbonyl, wherein M is selected from H, a metal and NH$_4$, and n is the valence of M.

In any of the formulae above, M may be a metal selected from Group 1, 2, or a transition metal (Groups 3 to 12) of the Periodic Table. In some examples, M may be a mono- or di-valent metal. In some examples, M is selected from Li, Na, K, Rb, Cs, Be, Mg, Ca, Sr, Ba, Zn. For the avoidance of doubt, Group 1 metals have a valence of 1 and Group 2 metals have a valence of 2.

In formula (I) above, if one or both of $R_1$ and $R_2$ are each alkyl, each alkyl may independently be a branched or straight chain alkyl, in some examples a branched or straight chain $C_1$ to $C_{20}$ alkyl, in some examples a branched or straight chain $C_5$ to $C_{15}$ alkyl, in some examples a branched or straight chain $C_6$ to $C_{12}$ alkyl, in some examples selected from straight-chain $C_7$, $C_8$, $C_9$, $C_{10}$ or $C_{11}$ alkyl. Each alkyl may be optionally substituted unless otherwise stated. A substituted alkyl is an alkyl that has one or more substituents. The substituents may be selected from halogen, nitro, cyano, hydroxy, optionally substituted alkoxy, optionally substituted amino, carboxy, alkoxycarbonyl, methylenedioxy, ethylenedioxy, optionally substituted alkylcarbonyloxy, optionally substituted aryl, optionally substituted heteroaryl and optionally substituted arylalkoxy.

In some examples, in any of the formulae, $M^{n+}$ is $Ba^{2+}$, n is therefore 2, $R_1$ and $R_2$ are each straight-chain, unsubstituted nonyl ($C_9$ alkyl) groups.

In formula (I) above, if any substituents on $R_1$ and $R_2$ is or contains an alkyl, each alkyl may independently be a branched or straight chain alkyl, in some examples a branched or straight chain $C_1$ to $C_{10}$ alkyl, in some examples a branched or straight chain $C_1$ to $C_6$ alkyl, in some examples a branched or straight chain $C_1$ to $C_4$ alkyl, in some examples selected from methyl, ethyl, n-propyl, i-propyl, n-butyl, i-butyl and t-butyl. Each alkyl may be optionally substituted unless otherwise stated. A substituted alkyl is an alkyl that has one or more substituents. The substituents may be selected from halogen, nitro, cyano, hydroxy, optionally substituted alkoxy, optionally substituted amino, carboxy, alkoxycarbonyl, methylenedioxy, ethylenedioxy, optionally substituted alkylcarbonyloxy and optionally substituted arylalkoxy.

In the formula (I) above, if it contains an aryl, each aryl may independently be selected from phenyl, naphthyl, dihydronaphthyl, tetrahydronaphthyl, indenyl and indanyl.

In the formula (I) above, if it contains a heteroaryl, each heteroaryl may independently be a mono- or bi-cyclic aromatic group having from 5 to 12 members and containing at least one hetero atom, in some examples one, two or three heteroatoms, which, if more than one heteroatom is present, may be the same or different. The at least one heteroatom may be selected from oxygen, nitrogen and sulphur. Each heteroaryl may independently be selected from thienyl, furyl, pyrrolyl, pyridyl and indolyl. Each aryl or heteroaryl may be substituted unless otherwise stated. A substituted aryl or heteroaryl is an aryl ring or heteroaryl ring having one or more substituents; optionally the substituents are selected from halogen, optionally substituted alkyl, nitro, cyano, hydroxy, optionally substituted alkoxy, optionally substituted amino, carboxy, alkoxycarbonyl, methylenedioxy, ethylenedioxy, optionally substituted alkylcarbonyloxy, optionally substituted arylalkoxy, optionally substituted acyl, optionally substituted aminocarbonyl and carboxy.

In formula (I) above, if it contains a halogen, each halogen may be selected from fluorine, chlorine, bromine and iodine.

In formula (I) above, if it contains an optionally substituted amino, each optionally substituted amino may be selected from an unsubstituted amino group ($-NH_2$), an amino group substituted with one alkyl group and an amino group substituted with two alkyl groups.

In some examples, the naphthalene sulfonate may be added in an amount of 10 ppm or more, by weight based on the total weight of the composition, in some examples 50 ppm or more, in some examples 100 ppm or more, in some examples 300 ppm or more, in some examples 500 ppm or more, in some examples 700 ppm or more, in some examples 800 ppm or more. In some examples, the naphthalene sulfonate may be added in an amount of from 10 ppm to 5000 ppm, by weight based on the total weight of the composition, in some examples in an amount of from 100 ppm to 2000 ppm, in some examples 400 to 1400 ppm, in some examples 500 ppm to 1300 ppm, in some examples 600 ppm to 1200 ppm, in some examples 700 ppm to 1100 ppm, in some examples 800 ppm to 1000 ppm, in some examples about 900 ppm.

Liquid Carrier

The electrostatic ink composition may further include a liquid carrier. In some examples, the chargeable particles including a resin may be dispersed in the liquid carrier. The liquid carrier can include or be a hydrocarbon, silicone oil, vegetable oil, etc. The liquid carrier can include, but is not limited to, an insulating, non-polar, non-aqueous liquid that can be used as a medium for toner particles, i.e. the chargeable particles including the resin and, in some examples, a colorant. The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, IsoparK™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™ Nisseki Naphthesol H™, #0 Solvent L™, #0 Solvent M™, #0 Solvent H™, Nisseki Isosol 300™ Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The liquid carrier can constitute about 20% to 99.5% by weight of the electrostatic ink composition, in some examples 50% to 99.5% by weight of the electrostatic ink composition. The liquid carrier may constitute about 40 to 90% by weight of the electrostatic ink composition. The liquid carrier may constitute about 60% to 80% by weight of the electrostatic ink composition. The liquid carrier may constitute about 90% to 99.5% by weight of the electrostatic ink composition, in some examples 95% to 99% by weight of the electrostatic ink composition.

The electrostatic ink composition, when printed on the print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

Colorant

The electrostatic ink composition, either before or after having been printed on the print substrate, may further include a colorant. The chargeable particles including the resin may further include the colorant. The colorant may be selected from a pigment, dye and a combination thereof. The colorant may be transparent, unicolor or composed of any combination of available colors. The colorant may be selected from a cyan colorant, a yellow colorant, a magenta colorant and a black colorant. The electrostatic ink composition and/or ink printed on the print substrate may include a plurality of colorants. The electrostatic ink composition and/or ink printed on the print substrate may include a first colorant and second colorant, which are different from one another. Further colorants may also be present with the first and second colorants. The electrostatic ink composition and/or ink printed on the print substrate may include first and second colorants where each is independently selected from a cyan colorant, a yellow colorant, a magenta colorant and a black colorant. In some examples, the first colorant includes a black colorant, and the second colorant includes a non-black colorant, for example a colorant selected from a cyan colorant, a yellow colorant and a magenta colorant. The colorant may be selected from a phthalocyanine colorant, an indigold colorant, an indanthrone colorant, a monoazo colorant, a diazo colorant, inorganic salts and complexes, dioxazine colorant, perylene colorant, anthraquinone colorants, and any combination thereof.

In some examples, the electrostatic ink composition includes a white colorant.

In some examples, the white colorant is selected from $TiO_2$, calcium carbonate, zinc oxide, and mixtures thereof. In some examples, the electrostatic ink composition includes a white colorant selected from rutile, anatase, and brookite, and mixtures thereof. In some examples, the electrostatic ink composition includes a white colorant in the form of rutile. The rutile form of $TiO_2$ exhibits the highest refractive index among the other forms of $TiO_2$ and the other listed pigments. All other parameters of inks being the same, the highest refractive index yields the highest opacity.

In some examples, the electrostatic ink composition or the electrostatic ink lacks a colorant. In some examples, the electrostatic ink composition or the electrostatic ink lacks inorganic particulate material. In some examples, the electrostatic ink composition or the electrostatic ink is substantially transparent when printed.

The colorant may constitute at least 0.1 wt % of the solids of the electrostatic ink composition, in some examples at least 0.2 wt % of the solids of the electrostatic ink composition, in some examples at least 0.3 wt % of the solids of the electrostatic ink composition, in some examples at least 0.5 wt % of the solids of the electrostatic ink composition, in some examples at least 1 wt % of the solids of the electrostatic ink composition. In some examples the colorant may constitute from 1 wt % to 50 wt % of the solids of the electrostatic ink composition, in some example from 5 wt % to 40 wt % of the solids of the electrostatic ink composition, in some examples from 20 wt % to 40 wt % of the solids of the electrostatic ink composition, in some examples 25 wt % to 35 wt % of the solids of the electrostatic ink composition in some examples 5 wt % to 20 wt % of the solids of the electrostatic ink composition.

The colorant may include a pigment. The pigments can be any pigment compatible with the liquid carrier and useful for electrostatic printing. For example, the pigment may be present as pigment particles, or may include a resin (in addition to the polymers described herein) and a pigment. The resins and pigments can be any of those commonly used as known in the art. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200.

Resin

The electrostatic ink composition includes a resin, which may be a thermoplastic resin. A thermoplastic polymer is sometimes referred to as a thermoplastic resin. The resin may coat a colorant, e.g. a pigment, such that the particles include a core of colorant, and have an outer layer of resin thereon. The outer layer of resin may coat the colorant partially or completely. In some examples, the polymer of the resin may be selected from ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may include a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may include a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer including acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may include two different polymers having acidic side groups. The two polymers having acidic side groups may have different acidities, which may fall within the ranges mentioned above. The resin may include a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may include two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may include a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may include a first polymer having a melt viscosity of 15000 poise or more, in some examples 20000 poise or more, in some examples 50000 poise or more, in some examples 70000 poise or more; and in some examples, the resin may include a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may include a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is NUCREL 960 (from DuPont®), and example of the second polymer is NUCREL 699 (from DuPont®), and an example of the third polymer is AC-5120 or AC-5180 (from Honeywell®). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin in electrostatic ink or ink composition includes a single type of polymer, the polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin includes a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may include two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may include (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may include a polymer having acidic side groups, as described above (which may be free of ester side groups), and a polymer having ester side groups. The polymer having ester side groups may be a thermoplastic polymer. The polymer having ester side groups may further include acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the BYNEL class of monomer, including BYNEL 2022 and BYNEL 2002, which are available from DuPont®.

The polymer having ester side groups may constitute 1% or more by weight of the total amount of the resin polymers, e.g. thermoplastic resin polymers, in the electrostatic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the electrostatic ink composition and/or the ink printed on the print substrate. The polymer having ester side groups may constitute from 5% to 50% by weight of the total amount of the resin polymers, e.g. thermoplastic resin polymers, in the electrostatic ink composition and/or the ink printed on the print substrate, in some examples 10% to 40% by weight of the total amount of the resin polymers, e.g. thermoplastic resin polymers, in the electrostatic ink composition and/or the ink printed on the print substrate, in some examples 5% to 30% by weight of the total amount of the resin polymers, e.g. thermoplastic resin polymers, in the electrostatic ink composition and/or the ink printed on the print substrate, in some examples 5% to 15% by weight of the total amount of the resin polymers, e.g. thermoplastic resin polymers, in the electrostatic ink composition and/or the ink printed on the print substrate in some examples 15% to 30% by weight of the total amount of the resin polymers, e.g. thermoplastic resin polymers, in the electrostatic ink composition and/or the ink printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the NUCREL family of toners (sold by DuPont®, e.g., NUCREL 403™, NUCREL 407™, NUCREL 609HS™, NUCREL 908HS™, NUCREL 1202HC™, NUCREL 30707™, NUCREL 1214™, NUCREL 903™, NUCREL 3990™, NUCREL 910™, NUCREL 925™, NUCREL 699™, NUCREL 599™, NUCREL 960™, NUCREL RX76™, and NUCREL 2806™), BYNEL 2002, BYNEL 2014, and BYNEL 2020 (sold by DuPont®), the ACLYN family of toners (sold by Honeywell®; e.g., ACLYN 201, ACLYN 246, ACLYN 285, and ACLYN 295), and the LOTADER family of toners (sold by Arkema®; e.g., LOTADER 2210, LOTADER 3430, and LOTADER 8200).

In some examples, the resin may constitute 5% to 99% by weight of the solids in the electrostatic ink composition, in some examples 50% to 90% by weight of the solids of the electrostatic ink composition, in some examples 70% to 90% by weight of the solids of the electrostatic ink composition. The remaining wt % of the solids in the ink composition may be a colorant and, in some examples, any other additives that may be present.

Charge Director and Charge Adjuvants

The electrostatic ink composition includes a charge director. The method as described herein may involve adding a charge director at any stage. The charge director may be added to impart a charge of positive or negative polarity on particles containing the resin and the colorant. The charge director includes a sulfosuccinate moiety of the general formula $[R_3-O-C(O)CH_2CH(SO_3)C(O)-O-R_4]^-$, where each of $R_3$ and $R_4$ is an alkyl group. In some examples, the charge director includes nanoparticles of a simple salt and a sulfosuccinate salt of the general formula $M'A_m$, wherein M' is a metal, m is the valence of M', and A is an ion of the general formula $[R_3-O-C(O)CH_2CH(SO_3)C(O)-O-R_4]^-$, where each of $R_3$ and $R_4$ is an alkyl group, or other charge directors as found in WO2007130069, which is incorporated herein by reference in its entirety. As described in WO2007130069, the sulfosuccinate salt of the general formula $M'A_m$ is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may include a cation selected from Mg, Ca, Ba, $NH_4$, tert-butyl ammonium, $Li^+$, and $Al^{+3}$, or from any sub-group thereof. The simple salt may include an anion selected from $SO_4^{2-}$, $PO_3^{3-}$, $NO_3^-$, $HPO_4^{2-}$, $CO_3^{2-}$, acetate, trifluoroacetate (TFA), $Cl^-$, $Bf$, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. The charge director may further include basic barium petronate (BBP).

In the formula $[R_3-O-C(O)CH_2CH(SO_3)C(O)-O-R_4]^-$, in some examples, each of $R_3$ and $R_4$ is an alkyl group. In some examples, each of $R_3$ and $R_4$ independently is a $C_{6-25}$ alkyl. In some examples, said alkyl group is linear. In some examples, said alkyl group is branched. In some examples, said alkyl group includes a linear chain of more than 6 carbon atoms. In some examples, $R_3$ and $R_4$ are the same. In some examples, at least one of $R_3$ and $R_4$ is $C_{13}H_{27}$. In some examples, M' is Na, K, Cs, Ca, or Ba. The formula $[R_3-O-C(O)CH_2CH(SO_3)C(O)-O-R_4]$ and/or the formula $M'A_m$ may be as defined in any part of WO2007130069 (in which $R_3$, $R_4$, M' and m in the present application are equivalent, respectively, to $R_1$, $R_2$, M' and n in WO2007130069).

In some examples, the charge director constitutes about 0.001% to 20%, in some examples 0.01 to 20% by weight, in some examples 0.01 to 10% by weight, in some examples 0.01 to 1% by weight of the solids of the electrostatic ink composition. In some examples, the charge director constitutes about 0.001 to 0.15% by weight of the solids of the electrostatic ink composition, in some examples 0.001 to 0.15%, in some examples 0.001 to 0.02% by weight of the solids of the electrostatic ink composition, in some examples 0.1 to 1% by weight of the solids of the electrostatic ink composition, in some examples 0.2 to 0.8% by weight of the solids of the electrostatic ink composition.

The electrostatic ink composition may include a charge adjuvant. A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. The charge adjuvant may be present in an amount of about 0.1 to 5% by weight, in some examples about 0.1 to 1% by weight, in some examples about 0.3 to 0.8% by weight of the solids of the electrostatic ink composition, in some examples about 0.4 to 0.6% by weight of the solids of the electrostatic ink composition.

In some examples, the electrostatic ink composition further includes a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

In some examples, the electrostatic ink composition further includes a salt of multivalent cation and a fatty acid anion and the composition further includes a charge director, as described herein and, in some examples a charge director selected from metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, and organic acid esters of polyvalent alcohols. In some examples, the electrostatic ink composition further includes a salt of multivalent cation and a fatty acid anion and the composition further includes the charge director selected from a sulfosuccinate moiety of the general formula $[R_3—O—C(O)CH_2CH(SO_3)C(O)—O—R_4]^-$, where each of $R_3$ and $R_4$ is an alkyl group, which may be as described above.

The charge adjuvant, which may, for example, be or include a salt of multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition.

Other Additives

The electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Printing Process and Print Substrate

Also provided is a method of electrostatic printing, the method including:
providing an electrostatic ink composition as described herein,
contacting the electrostatic ink composition with a latent electrostatic image on a surface to create a developed image,
transferring the developed image to a print substrate, in some examples via an intermediate transfer member.

In some examples, the surface on which the (latent) electrostatic image is formed or developed may be on a rotating member, e.g. in the form of a cylinder. The surface on which the (latent) electrostatic image is formed or developed may form part of a photo imaging plate (PIP). The method may involve passing the electrostatic ink composition of the invention between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from 80 to 160° C.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print.

EXAMPLES

The following illustrates examples of the methods and other aspects described herein. Thus, these Examples should not be considered as limitations of the present disclosure, but are merely in place to teach how to make examples of the present disclosure.

A naphthalene sulfonates additive was used in the Examples below. The naphthalene sulfonate additive was based upon neutral metal salts of dinonylnaphthalenesulfonic acid, the formula of which is shown below.

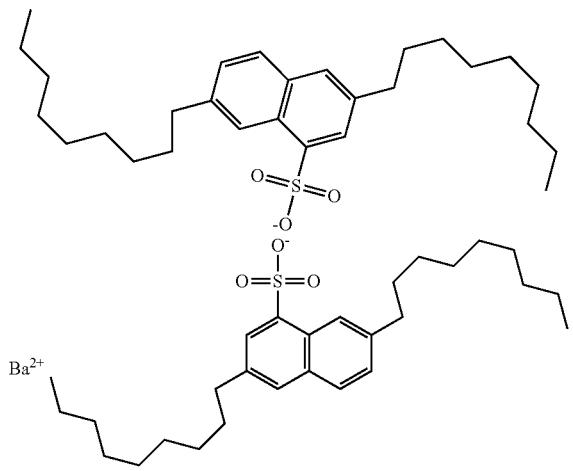

The metal salts could be, for example, divalent metal salts or monovalent metal salts. The standard diluent for these products is light mineral oil. An alternative diluents is polyalphaolefin PAO. Examples of the additives include:

NA-SUL@ BSN (a Neutral barium dinonylnaphthalenesulfonate in light mineral oil). NA-SUL® BSN/PAO is a Neutral barium dinonylnaphthalenesulfonate in polyalphaolefin PAO.

The metal could be Barium, Calcium magnesium Zink as divalent metal, or Lithium and sodium as a monovalent metal salts.

NA-SUL® is a registered trademark of King Industries, Inc.

Example 1—Production of Toner Particles and Liquid Toner

The general procedure for producing 4.5 HP Electroink is described in various patent applications such as in WO2013044991, Example 1. The charge director in the present Examples, unless otherwise stated, is a barium bis sulfosuccinate salt (SCD), which is described in US 2009/0311614 or WO2007130069.

4.5 SCD HP Electroink is 4.5 HP electroink charged with charge SCD as charge director.

Example 1

The general procedure for producing the resin particles and Electrolnk 4.5 liquid toner is as described in WO2013/044991, Example 1, on pages 31 and 32, except that, instead of the combination of soy lecithin/basic barium petronate/dodecyl benzene sulphonic acid as a charge director, a barium bis sulfosuccinate salt (SCD) charge director was used, and instead of a cyan pigment, a black pigment was used. The barium bis sulfosuccinate salt was as described in US 2009/0311614 or WO2007130069, included a sulfosuccinate moiety of the general formula [$R_3$—O—C(O)CH$_2$CH(SO$_3^-$)C(O)—O—$R_4$], wherein each of $R_3$ and $R_4$ independently is a $C_{6-25}$ alkyl, generally mainly C13 alkyl. When a weight of this SCD is referred to in the later Examples, it refers to the weight of a barium bis sulfosuccinate salt per gram of solids in the ink composition. Other charge directors as known in the art can also be used.

The toner concentrate made as described above containing the resin particles is charged utilizing ~5 mg/g of SCD charge director and diluted with additional Isopar L to produce a toner having a 3% NVS, with 97% of the carrier liquid being Isopar L.

Example 2

A black 4.5 SCD HP Electroink containing a naphthalene sulfonates additive was prepared as follows. The toner having 3% NVS was prepared in accordance with Example 1, and to this was added the above-mentioned naphthalene sulfonate additive (NA-SUL® BSN/PAO, available from King industries Co., Ltd) in an amount of 900 ppm. The additive was added to the working dispersion on the press (i.e. the printing apparatus). The charge director used was, as described above, a barium bis sulfosuccinate salt. This 4.5 SCD HP Electroink containing naphthalene sulfonates solution was labelled "EMBAO23 C MR54".

Comparative Example 3

Another working solution of Electroink was made according to the method of Example 2, except that instead of Black 4.5 SCD HP Electroink™, Black 4.5 NCD HP Electroink™ was used. Black 4.5 NCD Electroink™ contains a Natural Charge Director including lecithin. This solution was labelled "4.5 NCD Y Ip43".

Comparative Example 4

A further working solution of Electroink was made according to the method of Example 2, except that no EM23BAO (naphthalene sulfonate-containing slurry) was mixed with the Black 4.5 SCD HP Electroink™. This solution was labelled "no additives C".

Example 5

The liquid toners (electrostatic ink compositions) of Example 2, and Comparative Examples 3 and 4, were used as printing inks in an electrophotographic printing process using a HP Indigo 7000 digital press printer. The BOB resulting from each of the working fluids was monitored and tested.

FIG. 1 shows Background accumulation on Blanket (BOB) vs. blanket age in K impressions using the working solutions of Example 2 and Comparative Examples 3 and 4. The Optical Density (OD) of the BOB is plotted against the stage of printing at which it was measured. After each stage the background accumulation was cleaned from the blanket. Example 2 (i.e., solution labelled EMBAO23 C MR54) show a delayed increased in background accumulation when compared to Comparative Example 4.

Examination of the blanket also revealed that the working solution of Example 2 resulted in a far lower build-up of background accumulation when compared to that of Comparative Example 4.

While the compositions and related aspects have been described with reference to certain embodiments, those skilled in the art will appreciate that various modifications, changes, omissions, and substitutions can be made without departing from the spirit of the disclosure. It is intended, therefore, that the compositions and related aspects be limited by the scope of the following claims. The features of any dependent claim can be combined with the features of any of the other dependent claims, and any independent claim.

The invention claimed is:

1. An electrostatic ink composition comprising:
a) chargeable particles comprising a resin;
b) a charge director comprising a sulfosuccinate salt of the general formula $M'A_m$, wherein M' is a metal, m is the valence of M', and A is an ion of the general formula (I):

$$[R_3-O-C(O)CH_2CH(SO_3)C(O)-O-R_4]^- \qquad (I)$$

wherein each of $R_3$ and $R_4$ is an alkyl group; and
c) an optionally substituted naphthalene-sulfonate moiety shown in formula (III) below

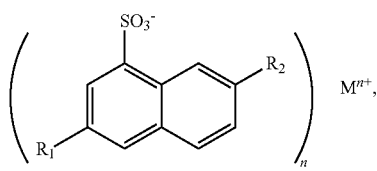

wherein
$R_1$ and $R_2$ are each independently selected from the group consisting of hydrogen, optionally substituted alkyl, halogen, nitro, cyano, hydroxy, optionally substituted alkoxy, optionally substituted amino, alkoxycarbonyl, optionally substituted alkylcarbonyloxy, optionally substituted aryl, optionally substituted heteroaryl, optionally substituted arylalkoxy, optionally substituted acyl, and optionally substituted aminocarbonyl,
M is selected from the group consisting of H, a metal, and $NH_4$, and
n is the valence of M.

2. The electrostatic ink composition according to claim 1, wherein M is a metal selected from the group consisting of a metal from Group 1 of the Periodic Table, a metal from Group 2 of the Periodic Table, and a transition metal from Groups 3 to 12 of the Periodic Table.

3. The electrostatic ink composition according to claim 2, wherein M is selected from the group consisting of Li, Na, K, Rb, Cs, Be, Mg, Ca, Sr, Ba, and Zn.

4. The electrostatic ink composition according to claim 1, wherein one or both of $R_1$ and $R_2$ are each alkyl, and each alkyl is independently a branched or straight chain $C_5$ to $C_{15}$ alkyl.

5. The electrostatic ink composition according to claim 1, wherein $M^{n+}$ is $Ba^{2+}$, n is therefore 2, $R_1$ and $R_2$ are each straight-chain, unsubstituted nonyl ($C_9$ alkyl) groups.

6. The electrostatic ink composition according to claim 1, wherein each of $R_3$ and $R_4$, independently, is a $C_{6-25}$ alkyl.

7. The electrostatic ink composition according to claim 6, wherein M' is Na, K, Cs, Ca, or Ba.

8. The electrostatic ink composition according to claim 1, wherein the composition further comprises a liquid carrier and the chargeable particles comprising a resin are dispersed in the liquid carrier.

9. A method of electrostatic printing, the method comprising:
providing an electrostatic ink composition according to claim 1,
contacting the electrostatic ink composition with a latent electrostatic image on a surface to create a developed image,
transferring the developed image to a print substrate.

10. The method of claim 9, wherein the developed image is transferred from the surface to the print substrate via an intermediate transfer member.

11. A print substrate having printed thereon an electrostatic ink composition comprising:
a) a resin;
b) a charge director comprising a sulfosuccinate salt of the general formula $M'A_m$, wherein M' is a metal, m is the valence of M', and A is an ion of the general formula (I):

$$[R_3-O-C(O)CH_2CH(SO_3)C(O)-O-R_4]^- \qquad (I)$$

wherein each of $R_3$ and $R_4$ is an alkyl group; and
c) an optionally substituted naphthalene-sulfonate moiety shown in formula (III) below

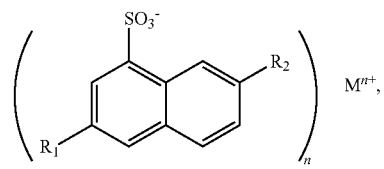

wherein $R_1$ and $R_2$ are each independently selected from the group consisting of hydrogen, optionally substituted alkyl, halogen, nitro, cyano, hydroxy, optionally substituted alkoxy, optionally substituted amino, alkoxycarbonyl, optionally substituted alkylcarbonyloxy, optionally substituted aryl, optionally substituted heteroaryl, optionally substituted arylalkoxy, optionally substituted acyl, and optionally substituted aminocarbonyl,
M is selected from the group consisting of H, a metal, and $NH_4$, and
n is the valence of M.

* * * * *

UNITED STATES PATENT AND TRADEMARK OFFICE
CERTIFICATE OF CORRECTION

PATENT NO. : 9,709,915 B2  
APPLICATION NO. : 15/102860  
DATED : July 18, 2017  
INVENTOR(S) : Emad Masoud et al.

Page 1 of 1

It is certified that error appears in the above-identified patent and that said Letters Patent is hereby corrected as shown below:

On the Title Page

In item (72), Address of the 1st Inventors, in Column 1, Line 1, delete "Nes Ziona" and insert -- Ness Ziona --, therefor.

In item (72), Address of the 2nd Inventors, in Column 1, Line 2, delete "Givataim" and insert -- Givatayim --, therefor.

In item (72), Address of the 4th Inventors, in Column 1, Line 4, delete "Nes Ziona" and insert -- Ness Ziona --, therefor.

In item (73), name of the Assignee, in Column 1, Line 1, delete "Parkard" and insert -- Packard --, therefor.

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*